United States Patent Office 2,857,366
Patented Oct. 21, 1958

2,857,366

MONOFLUOROACETYLENE, POLYMERS, AND PREPARATION

William J. Middleton, Claymont, Del., assignor to E. I. du Pont de Nemours and Company, Wilmington, Del., a corporation of Delaware No Drawing. Application August 28, 1956
Serial No. 606,558

4 Claims. (Cl. 260—92.1)

This invention is concerned with monofluoroacetylene, $HC \equiv CF$, and a process for its preparation.

Monofluoroacetylene is a relatively simple compound but has not hitherto been prepared.

This invention has as an object monofluoroacetylene. A further object is a process for preparing the same. Another object is the preparation of a polymerization intermediate. Still another is the preparation of polymers useful in the preparation of molded objects.

These objects are accomplished by the present invention of (a) Monofluoroacetylene,
(b) The process for the preparation of monofluoroacetylene by the thermal decomposition of monofluoromaleic anhydride, and
(c) Monofluoroacetylene polymers.

The invention is illustrated by the following example.

EXAMPLE

Fluoroacetylene

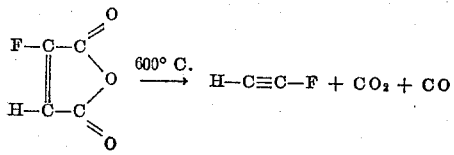

A 2.5-cm. quartz tube packed for a length of 25 cm. with quartz rings is heated to 600 C. by means of an electric muffle furnace and 6.0 g. of monofluoromaleic anhydride is distilled through at a pressure of 1–2 mm./Hg. The exhaust gases are condensed to a white solid in a trap cooled by liquid nitrogen. The carbon dioxide and the monofluoroacetylene in the trap are separated by trap-to-trap distillation. The monofluoroacetylene boils at a lower temperature than carbon dioxide. The yield of monofluoroacetylene in this reaction is nearly quantitative.

Monofluoroacetylene is identified by its infrared spectrum which shows absorption bands for an acetylenic hydrogen (3.0 micron), triple bond (4.40, 4.54 micron) and a carbon-fluorine bond (9.25, 9.50 micron). The mass spectrometer pattern of monofluoroacetylene indicates a molecular formula of $C_2HF$.

The nuclear magnetic resonance spectrum of this compound shows a molecule with a single hydrogen atom and a single fluorine atom.

Monofluoroacetylene is a colorless gas at room temperature and atmospheric pressure. At $-196°$ C. monofluoroacetylene is a white solid. When this solid is allowed to warm up, it melts and boils below $-78°$ C. Monofluoroacetylene is surprisingly stable in air, whereas monochloroacetylene is spontaneously inflammable in air.

Monofluoroacetylene polymerizes spontaneously without added catalyst when the gas is stored in a glass container at ordinary temperature and pressure. The polymer is formed slowly over a period of several days and is a yellow-brown powder. It is a thermoplastic solid which can be molded under heat and pressure to prepare molded objects, such as coil forms and slot insulation for electric motors. When monofluoroacetylene is stored as a liquid under pressure, even at temperatures below $0°$ C., it is subject to spontaneous detonation and due precautions must be observed.

The temperature employed for the thermal decomposition of monofluoromaleic anhydride to obtain monofluoroacetylene may be varied widely from about $300°$ C. up to $1500°$ C. and above. Highest yields with least decomposition of the product are obtained when temperatures in the range of $400-800°$ C. are employed, and this therefore represents the preferred practice. In operation at temperatures above $800°$ C., short contact times must be employed in order to prevent undue decomposition of the product.

The means used to heat the vapors of monofluoromaleic anhydride (B. P. $162°$ C.) to the decomposition temperature are not critical. In the above example, quartz is used as a means of heat exchange, but other materials, such as silica, glass and porcelain, which are inert to monofluoromaleic anhydride and its decomposition products may be used. No added catalyst is needed for the thermal decomposition, and the yield of monofluoroacetylene is substantially quantitative.

Pressure is not a critical variable in the process of this invention, and it may be carried out at atmospheric pressure. However, it is preferred to operate at a partial pressure of monofluoroacetylene which is less than atmospheric pressure. This may be accomplished by operating in a partial vacuum as in the example or by diluting the gas phase with an inert gas such as nitrogen.

Monofluoromaleic anhydride for use in preparing monofluoroacetylene can be made from chlorotrifluoroethylene and vinylidene chloride by the following steps:

Step 1.—Chlorotrifluoroethylene, 300 parts, and vinylidene chloride, 350 parts, were reacted in the presence of one part of hydroquinone at $180°$ C. and autogenous pressure for ten hours to obtain 1,1,2-trichloro-2,3,3-trifluorocyclobutane, B. P. $120-121°$ C., which was separated by fractional distillation.

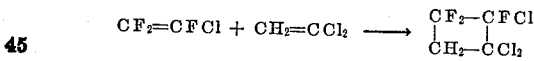

Step 2.—1,1,2-trichloro-2,3,3-trifluorocyclobutane, 400 parts, was heated with 150 parts of zinc dust in 240 parts of refluxing ethanol for two hours to obtain 1-chloro-2,3,3-trifluorocyclobutene, B. P. $51.5-52°$ C., which was distilled from the mixture.

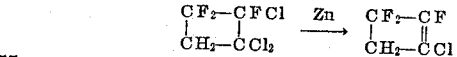

Step 3.—1-chloro-2,3,3-trifluorocyclobutene, 214 parts, was oxidized at $15-20°$ C. with 160 parts of sodium hydroxide and 316 parts of potassium permanganate in 4000 parts of water, the manganese dioxide filtered off, and the filtrate acidified with sulfuric acid. The filtrate was extracted with ether and the ether solution dried and evaporated. The residue was recrystallized from a 1/1 acetone/benzene mixture. The resulting 2,2-difluorosuccinic acid melts at $154-155°$ C.

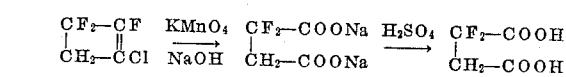

Step 4.—2,2-difluorosuccinic acid, 125 parts, was dehydrofluorinated by heating at $100°$ C. for 16 hours with 97 parts of sodium hydroxide in 400 parts of water followed by acidification with hydrochloride acid to obtain fluorofumaric acid, M. P. 236–237° C.

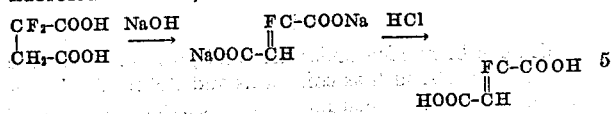

*Step 5.*—Fluorofumaric acid, 70 parts, was mixed in a still with 45 parts of phosphorus pentoxide. The monofluoromaleic anhydride distilled over. On redistillation it boiled at 162° C.

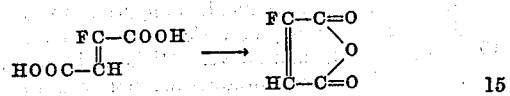

The foregoing detailed description has been given for clearness of understanding only and no unnecessary limitations are to be understood therefrom. The invention is not limited to the exact details shown and described. Obvious modifications will occur to those skilled in the art.

The embodiments of the invention in which an exclusive property or privilege is claimed are defined as follows:

1. Monofluoroacetylene.
2. Solid, thermoplastic monofluoroacetylene polymer.
3. Process of preparing monofluoroacetylene which comprises heating monofluoromaleic anhydride at 400–800° C.
4. Process of preparing monofluoroacetylene which comprises heating monofluoromaleic anhydride at 300–1500° C.

References Cited in the file of this patent

UNITED STATES PATENTS 2,546,997    Gochenour _____ Apr. 3, 1951

FOREIGN PATENTS 359,997    Great Birtain _____ Oct. 26, 1931

OTHER REFERENCES

"Organic Reactions," p. 53, Adams et al., Wiley, 1944.

Huntress: "Organic Chlorine Compounds," p. 930 (1948).

Wright Air Development Report 55–220.